(12) United States Patent
Amimoto et al.

(10) Patent No.: US 11,158,101 B2
(45) Date of Patent: Oct. 26, 2021

(54) INFORMATION PROCESSING SYSTEM, INFORMATION PROCESSING DEVICE, SERVER DEVICE, IMAGE PROVIDING METHOD AND IMAGE GENERATION METHOD

(71) Applicant: SONY INTERACTIVE ENTERTAINMENT INC., Tokyo (JP)

(72) Inventors: Tatsuki Amimoto, Tokyo (JP); Akira Nishiyama, Tokyo (JP)

(73) Assignee: SONY INTERACTIVE ENTERTAINMENT INC., Tokyo (JP)

(*) Notice: Subject to any disclaimer, the term of this patent is extended or adjusted under 35 U.S.C. 154(b) by 0 days.

(21) Appl. No.: 16/615,251

(22) PCT Filed: Jun. 7, 2017

(86) PCT No.: PCT/JP2017/021139
§ 371 (c)(1),
(2) Date: Nov. 20, 2019

(87) PCT Pub. No.: WO2018/225187
PCT Pub. Date: Dec. 13, 2018

(65) Prior Publication Data
US 2020/0126280 A1    Apr. 23, 2020

(51) Int. Cl.
*G06T 11/60*    (2006.01)
*G06T 7/215*    (2017.01)
(Continued)

(52) U.S. Cl.
CPC .............. *G06T 11/60* (2013.01); *G06F 3/012* (2013.01); *G06T 7/215* (2017.01); *H04L 67/38* (2013.01); *G06T 2215/16* (2013.01)

(58) Field of Classification Search
CPC .............................. G06T 19/006; G06T 11/60
See application file for complete search history.

(56) References Cited

U.S. PATENT DOCUMENTS 10,113,877 B1\* 10/2018 Schaefer ................... G06F 3/16
2017/0053456 A1\* 2/2017 Cho .................... G06K 9/00604
(Continued)

FOREIGN PATENT DOCUMENTS

JP    9-307883 A    11/1997
JP    2006-60309 A    3/2006
(Continued)

OTHER PUBLICATIONS

International Search Report and Written Opinion dated Sep. 5, 2017, from International Application No. PCT/JP2017/021139, 9 sheets.
(Continued)

*Primary Examiner* — Phi Hoang
(74) *Attorney, Agent, or Firm* — Katten Muchin Rosenman LLP

(57) ABSTRACT

A position data acquiring unit 200 acquires position data indicating a position of a real object. A delay deriving unit 206 derives delay time in an information processing system 1. A motion predicting unit 300 predicts a movement of the object, and identifies an object position at a future time on the basis of the position data acquired by the position data acquiring unit 200, the predetermined length of time being equal to or longer than the delay time. An image generating unit 302 generates a prediction image in which the object position at the future time is reflected. A display image providing unit 204 acquires the generated prediction image, and provides the prediction image to an HMD.

8 Claims, 6 Drawing Sheets

(51) Int. Cl.
   *G06F 3/01*     (2006.01)
   *H04L 29/06*    (2006.01)

(56)           References Cited

U.S. PATENT DOCUMENTS

| 2017/0155885 A1* | 6/2017  | Selstad ..................... G06T 3/00 |
| 2017/0227765 A1* | 8/2017  | Mammou ................ H04L 65/60 |
| 2018/0047332 A1* | 2/2018  | Kuwahara ............ G09G 3/2096 |
| 2018/0210628 A1* | 7/2018  | McPhee ................ G06T 19/006 |
| 2018/0300189 A1* | 10/2018 | Peng ......................... G06F 8/60 |
| 2019/0251892 A1* | 8/2019  | Stoll ................... A63F 13/5255 |

FOREIGN PATENT DOCUMENTS

| JP | 2015-212946 A    | 11/2015 |
| JP | 2016-218916 A    | 12/2016 |
| WO | 2014/034059 A1   | 3/2014  |
| WO | 2015/098292      | 7/2015  |
| WO | 2016/017245 A1   | 2/2016  |
| WO | 2017/047178 A1   | 3/2017  |

OTHER PUBLICATIONS

International Preliminary Report on Patentability dated Dec. 10, 2019, from International Application No. PCT/JP2017/021139, 13 sheets.

\* cited by examiner

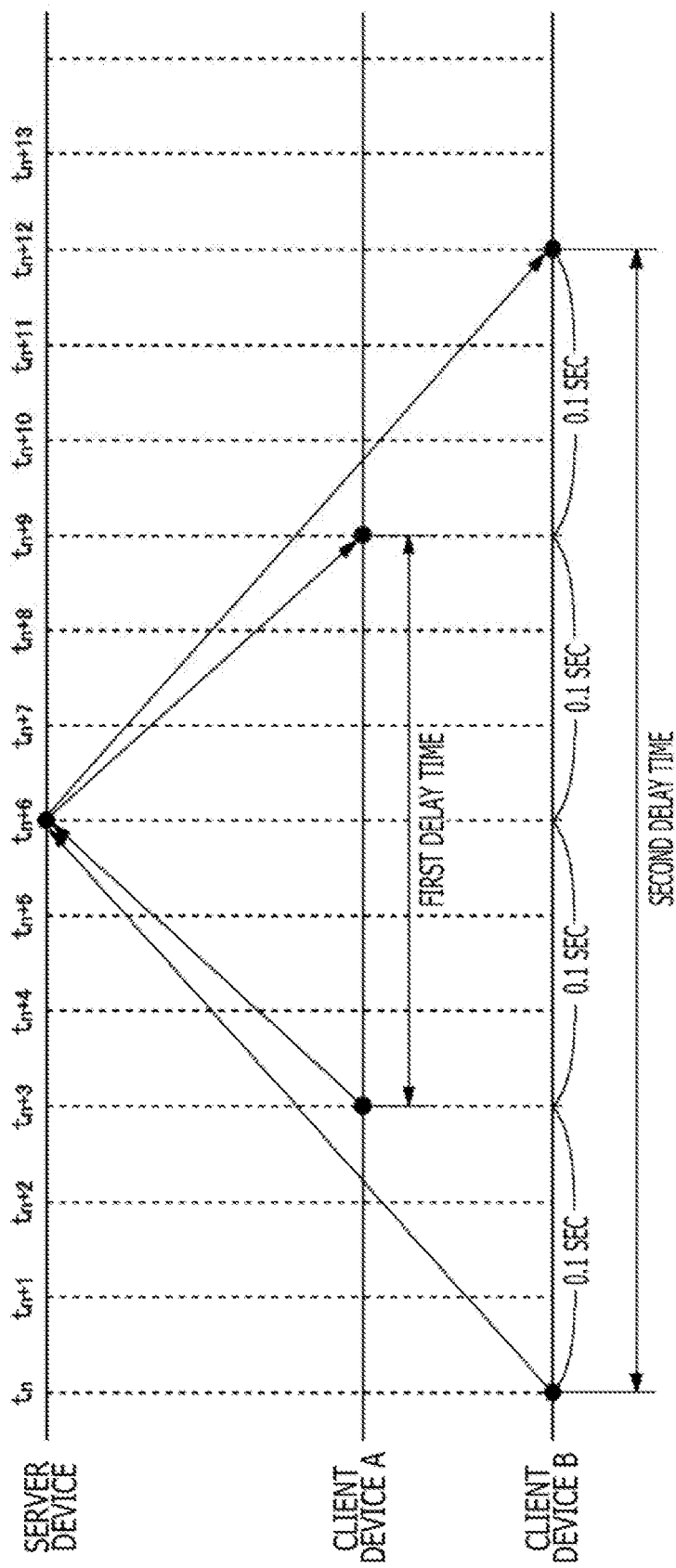

INFORMATION PROCESSING SYSTEM, INFORMATION PROCESSING DEVICE, SERVER DEVICE, IMAGE PROVIDING METHOD AND IMAGE GENERATION METHOD

TECHNICAL FIELD

The present invention relates to a technology of generating and displaying images in movements of real objects are reflected.

BACKGROUND ART

Head-mount displays (HMDs) are worn by a user at his/her head, and provides the user with a visual world of virtual reality (VR) or mixed reality (MR). Since HMDs provide images in a part of the field of view or the entire field of view of a user, it can enhance the sense of immersion of the user into a visual world. PTL 1 relates to a technology of generating images that change following movements of the head of a user, and discloses a technology of using the temporal order of posture angle data already received about the head to predict posture angle data to receive after a predetermined length of time, and executing a rendering process on images based on the predicted posture angle data.

CITATION LIST

Patent Literature

[PTL 1]
PCT Patent Publication No. WO2015/098,292

SUMMARY

Technical Problem

Mixed reality creates a space in which the real world and a virtual world are merged. In a world of mixed reality, if, for example, a virtual object that makes the same movement as an actual movement of a user is displayed on an HMD, and the movement of the virtual object is displayed after a delay with respect to the actual movement of the user, the sense of feeling that the virtual object is making the same movement as the user deteriorates, and also it becomes a cause of image sickness of the user.

The present invention has been made in view of such problems, and an object thereof is to provide a technology of displaying, on a display, an image generated by predicting a future time on the basis of the position of a real object in a space. Note that such a display is not limited to an HMD, but may be a monitor.

Solution to Problem

In order to solve the problems explained above, an information processing system according to an aspect of the present invention is an information processing system that generates an image to be provided to a display, the information processing system including: a position data acquiring unit that acquires position data indicating a position of a real object; a delay deriving unit that derives delay time in the information processing system; a motion predicting unit that predicts a movement of the object, and identifies an object position at a future time which is a predetermined length of time ahead, on the basis of the position data acquired by the position data acquiring unit, the predetermined length of time being equal to or longer than the delay time; an image generating unit that generates a prediction image in which the object position at the future time is reflected; and a display image providing unit that acquires the generated prediction image, and provides the prediction image to the display. The delay deriving unit derives delay time including a length of time that elapses from a time when the position data acquiring unit acquires position data to a time when the display image providing unit provides, to the display, a prediction image in which an object position at a future time predicted on the basis of the position data is reflected.

Another aspect of the present invention is an information processing device. The information processing device includes: a position data acquiring unit that acquires position data indicating a position of a real object; a delay deriving unit that derives delay time; and a display image providing unit that acquires a prediction image, and provides the prediction image to a display, the prediction image being generated by a server device predicting a movement of the object on the basis of position data such that an object position at a future time which is a predetermined length of time ahead is reflected to the prediction image, the predetermined length of time being equal to or longer than the delay time.

Still another aspect of the present invention is a server device. The server device includes: a motion predicting unit that acquires, from an information processing device, delay time and position data indicating a position of a real object, predicts a movement of the object, and identifies an object position at a future time which is a predetermined length of time ahead, the predetermined length of time being equal to or longer than the delay time; and an image generating unit that generates a prediction image in which the position of the object at the future time is reflected.

Note that valid aspects of the present invention also include ones obtained through conversion of any combination of the constituent elements mentioned above, and representations of the present invention between a method, a device, a system, a computer program, a recording medium having recorded thereon a computer program readably and veritably, a data structure, and the like.

BRIEF DESCRIPTION OF DRAWINGS

FIG. 6 is a figure illustrating an example in which there are two client devices.

DESCRIPTION OF EMBODIMENT

Figure 1:
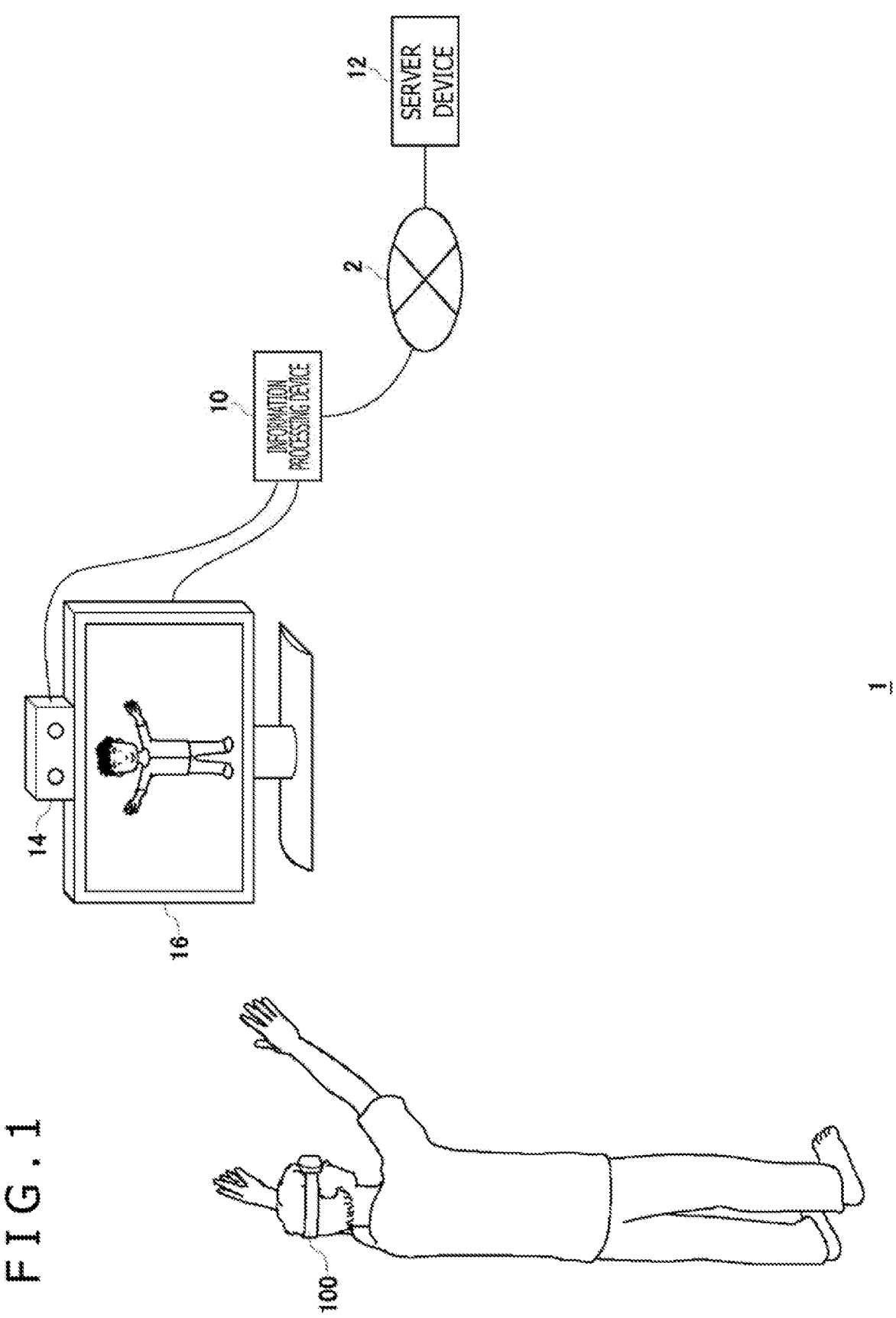
FIG. 1 is a figure illustrating a configuration example of an information processing system in an embodiment.

FIG. 1 illustrates a configuration example of an information processing system 1 in an embodiment. The information processing system 1 includes an information processing device 10, a head-mount display (HMD) 100, an image capturing device 14 that captures an image of a user who has the HMD 100 on, an output device 16 that displays images and sound, and a server device 12. The output device 16 may be a monitor. The information processing device 10 is connected to the server device 12 by way of an external network 2 such as the Internet through an access point (AP) in a manner that enables communication therebetween.

The HMD 100 is a display device that displays images on display panels positioned in front of the eyes of a user who has the HMD 100 on at his/her head, and provides the user with a visual world of virtual reality (VR) or mixed reality (MR). By giving the HMD 100 a head-tracking function, and updating displayed images in conjunction with movements of the head of the user, the sense of immersion into the visual world can be enhanced. The HMD 100 displays a left-eye image and a right-eye image on a left-eye display panel and a right-eye display panel, respectively and separately. These images constitute a parallax image as seen from left and right, and realizes a stereoscopic view.

Images in the virtual world are generated by the server device 12, and provided by the information processing device 10 to the HMD 100. The information processing device 10 may singly have a function of executing an application such as a gaming application upon receiving manipulation information indicating manipulation of an input device by a user, but in the information processing system 1 in the embodiment, the information processing device 10 operates as a client device that provides images generated in the server device 12 to the HMD 100.

The image capturing device 14 is a stereo camera which captures images of the user who has the HMD 100 on at predetermined periods, and supplies the captured images to the information processing device 10. In the embodiment, the image-capturing periods are 30 fps. The image capturing device 14 acquires user position data in an image-capturing space, and specifically acquires relative position data from the image capturing device 14 in a real three-dimensional space. The user position data includes position data about all the parts of the user in the three-dimensional space, that is, the user position data includes all of the face position, hand positions, torso position, leg positions, and the like. Accordingly, the user position data in the embodiment includes at least data related to the posture of the user. Hereinafter, the phrase "user position data" is used as a close synonym of the phrase "user posture data" in some cases.

A marker for tracking the head of the user (tracking light-emitting diode (LED)) is provided to the HMD 100, and the information processing device 10 detects a movement of the HMD 100 based on positions of the marker included in captured images. Note that a motion sensor (an acceleration sensor, and a gyro sensor) may be mounted on the HMD 100, and the information processing device 10 may acquire, from the HMD 100, sensor data about detection by the motion sensor to thereby perform a highly precise tracking process along with utilization of captured images of the marker. The information processing device 10 may use the marker included in captured images or detection data of the motion sensor to detect a movement of the HMD 100. In the embodiment, the posture of the HMD 100 is utilized for determining the user's line-of-sight direction. The determined user's line-of-sight direction is provided from the information processing device 10 to the server device 12. The server device 12 arranges, in a three-dimensional virtual space, a virtual camera having an optical axis lying along the user's line-of-sight direction. An image of the three-dimensional virtual space captured by the virtual camera is generated, and sent to the information processing device 10.

As mentioned below, the HMD 100 is provided with a light emitting unit that performs impulse light emission, and the information processing device 10 measures part of or entire delay time in the information processing system 1 on the basis of light emission of the light emitting unit included in captured images.

In the information processing system 1, although the output device 16 is not necessarily required for the user who has the HMD 100 on since the user views images on the HMD 100, preparing the output device 16 allows another user to view images displayed on the output device 16. The information processing device 10 may display, on the output device 16, images that are the same as images that the user who has the HMD 100 on is viewing.

Figure 2:
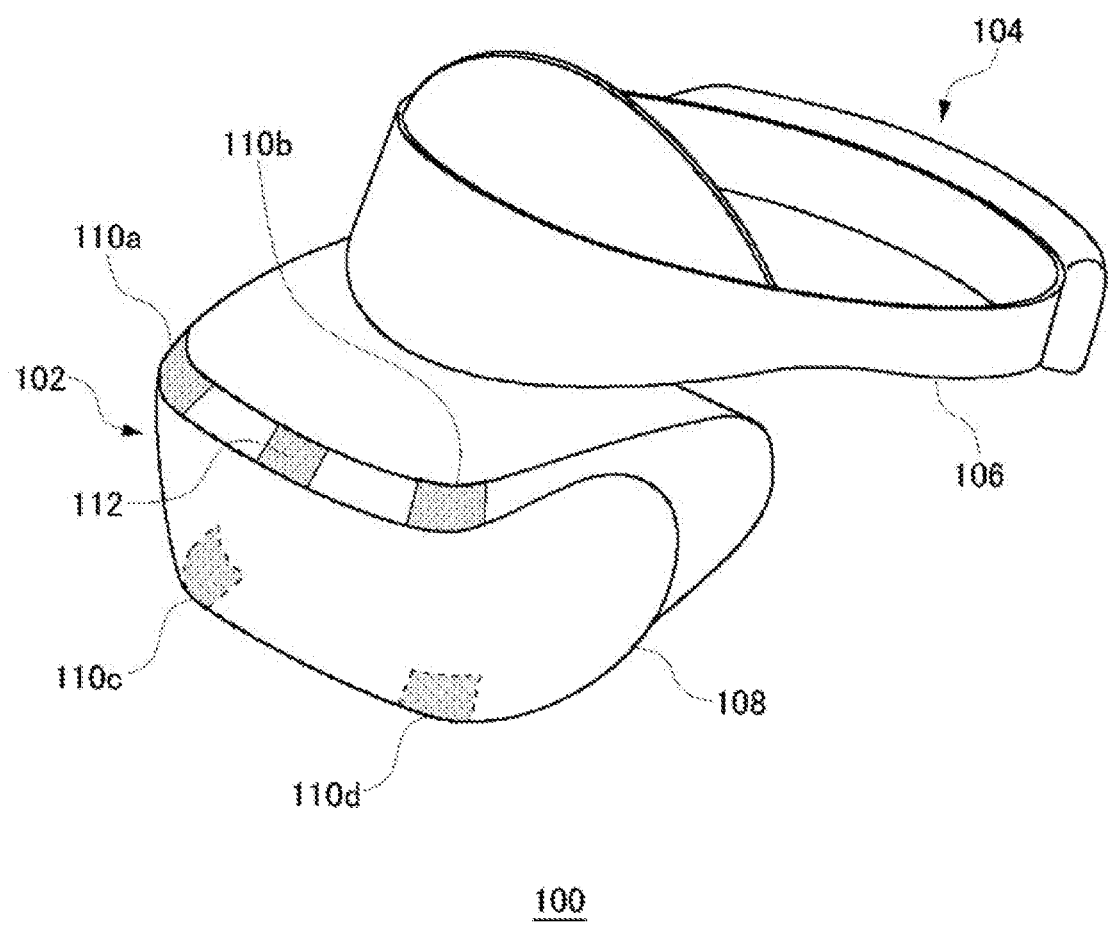
FIG. 2 is a figure illustrating an example of the appearance shape of an HMD.

FIG. 2 illustrates an example of the appearance shape of the HMD 100. The HMD 100 is constituted by an output mechanism unit 102, and an attachment mechanism unit 104. The attachment mechanism unit 104 includes an attachment band 106 that encircles the head when the user puts it on, and fixes the HMD 100 to the head. The attachment band 106 is made of a material or has a structure that allows adjustment of the length of the attachment band 106 according to the head circumference of the user.

The output mechanism unit 102 includes a housing 108 having a shape to cover left and right eyes when the HMD 100 is worn by the user, and includes therein display panels that face the eyes when the user has the HMD 100 on. The display panels may be liquid crystal panels, organic electroluminescence (EL) panels, or the like. The inside space of the housing 108 further includes a pair of left and right optical lenses that are positioned between the display panels and the eyes of the user, and enlarge the viewing angle of the user. The HMD 100 may further include speakers or earphones at positions corresponding to the ears of the user, and may be configured to be connected to an external headphone. Note that the HMD 100 may have a transmission-type display.

The external surface of the housing 108 includes markers 110*a*, 110*b*, 110*c*, and 110*d*. Although in this example, tracking LEDs constitute the markers 110, they may be other types of markers as long as the makers can be captured by the image capturing device 14, and allow the information processing device 10 to perform image analysis of the marker positions. Although the number and arrangement of the markers 110 are not particularly limited, there needs to be a number of markers that allow detection of the posture of the HMD 100, and the markers need to be arranged in a manner that allows such detection. In the illustrated example, the markers 110 are provided at the four corners on the front surface of the housing 108.

In addition, the housing 108 includes a light emitting unit 112 that performs impulse light emission when instructed by the information processing device 10 to perform light emission. Impulse light emission by the light emitting unit 112 is captured by the image capturing device 14, and is utilized for measuring the total delay time that is generated in the processing system and transmission system of the information processing system 1. The light emitting unit 112 may be configured to be capable of multicolor light emission.

The HMD 100 may be connected to the information processing device 10 through a cable, or may be connected by using a known wireless communication protocol. The HMD 100 sends sensor data about detection by the motion sensor to the information processing device 10, and the HMD 100 receives images provided by the information processing device 10, and displays the images on the left-eye display panel and the right-eye display panel.

Figure 3:
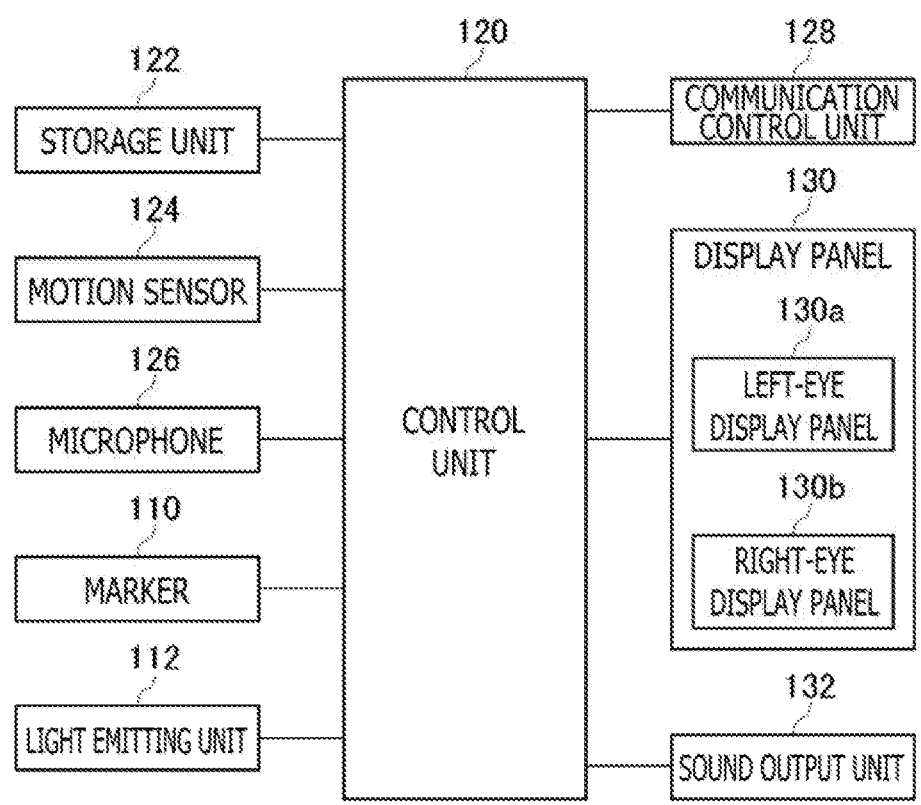
FIG. 3 is a figure illustrating functional blocks of an HMD.

FIG. 3 is a figure illustrating functional blocks of the HMD 100. A control unit 120 is a main processor that processes and outputs commands or various types of data such as image data, sound data, or sensor data. A storage unit 122 temporarily stores data, commands, or the like to be processed by the control unit 120. A motion sensor 124 detects motion data about the HMD 100. The motion sensor 124 includes an at least tri-axial acceleration sensor and tri-axial gyro sensor.

A communication control unit 128 sends, to the external information processing device 10, data output from the control unit 120 via a wired or wireless communication through a network adapter or an antenna. In addition, the communication control unit 128 receives data from the information processing device 10 via a wired or wireless communication through a network adapter or an antenna, and outputs the data to the control unit 120.

Upon receiving image data or sound data from the information processing device 10, the control unit 120 supplies the data to a display panel 130, and makes the display panel 130 display the data, and also the control unit 120 supplies the data to a sound output unit 132, and makes the sound output unit 132 output sound. The display panel 130 is constituted by a left-eye display panel 130a and a right-eye display panel 130b, and a pair of parallax images are displayed on the display panels, respectively. In addition, the control unit 120 causes sensor data from the motion sensor 124 or sound data from a microphone 126 to be sent from the communication control unit 128 to the information processing device 10.

In addition, upon receiving a light emission instruction from the information processing device 10, the control unit 120 makes a light emitting unit 112 emit light only for a moment. The light emission time of the light emitting unit 112 is set such that it is not longer than a single image-capturing period of the image capturing device 14. Preferably, if the image capturing device 14 performs image capturing at periods of ⅟30 seconds, the light emission time of the light emitting unit 112 is set to be shorter than ⅟30 seconds, and light emitted from the light emitting unit 112 is captured only in a single captured image. Note that preferably the marker 110 is always kept turned on for tracking processes, and the light emitting unit 112 emits light in a color different from the color of light emitted from the marker 110. Note that if the HMD 100 does not include the marker 110, the light emitting unit 112 may emit light of any color without being limited by the color of light emitted from the marker 110.

Figure 4:
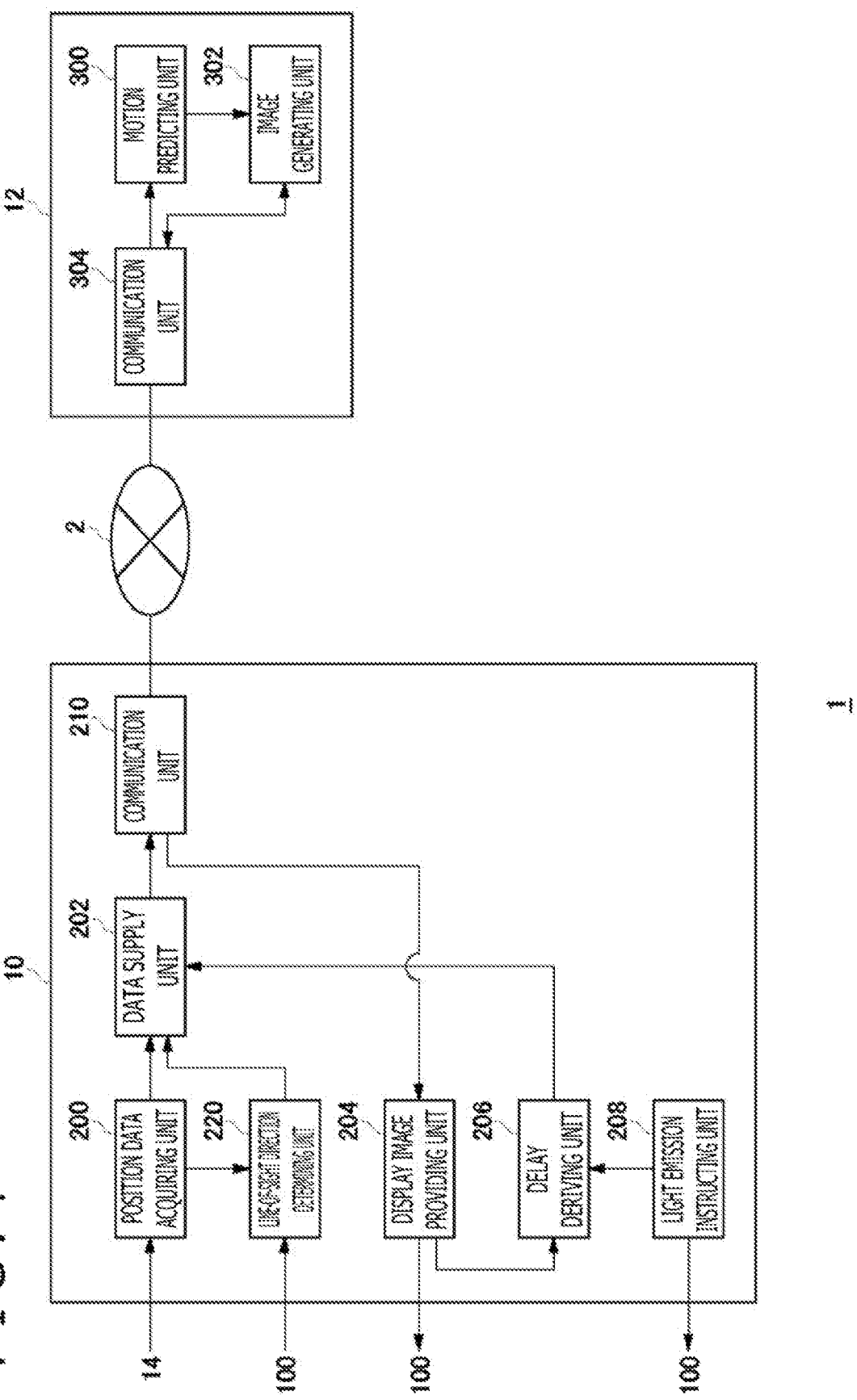
FIG. 4 is a figure illustrating the configurations of an information processing device and a server device.

FIG. 4 is a figure illustrating the configurations of the information processing device 10 and the server device 12. In the information processing system 1, the information processing device 10 operates as a client device, and includes a position data acquiring unit 200, a data supply unit 202, a display image providing unit 204, a delay deriving unit 206, a light emission instructing unit 208, a line-of-sight direction determining unit 220, and a communication unit 210. The server device 12 includes a motion predicting unit 300, an image generating unit 302, and a communication unit 304.

Individual elements illustrated as functional blocks that perform various processes in FIG. 4 can be constituted by a circuitry block, a memory, and another large-scale integration (LSI) if they are realized by hardware, and are realized by a program loaded onto a memory, or the like if they are realized by software. Accordingly, those skilled in the art should understand that these functional blocks can be realized in various forms only by hardware, only by software, or by a combination of them, and the forms of the functional blocks are not limited to any particular one.

In the embodiment, the server device 12 receives a captured image capturing an image of a user in a real space from the information processing device 10, and generates an image in which a virtual object in a virtual space is moved along with a user movement. For example, if a user raises both hands, making a banzai gesture, the server device 12 makes the virtual object make a motion of raising both hands, making a banzai gesture, in the virtual space. The server device 12 sends the generated image to the information processing device 10, and the information processing device 10 sends the image to the HMD 100, and makes the display panel 130 display the image.

At this time, if the time at which the user makes a banzai gesture does not match the time at which the virtual object displayed on the display panel 130 makes a banzai gesture, the sense of feeling about synchronization of movement between the virtual object and the user deteriorates. In addition, some kinds of motion become a cause of image sickness of the user.

In the information processing system 1, the information processing device 10 sends an image in which a user is captured to the server device 12 through the network 2, the server device 12 uses the captured image to generate an image to be displayed on the HMD 100, and sends the generated image to the information processing device 10 through the network 2, and the information processing device 10 provides the image to be displayed to the HMD 100. This series of flow is performed separately in a processing system related to captured-image acquisition and image processing, and in a transmission system that transmits images through the network 2, and the processing system and the transmission system each need a certain amount of time.

The amount of time that elapses after an image of a user is captured until an image generated on the basis of the captured image is displayed on the HMD 100 is defined as "delay time." If an image of a user who made a banzai gesture is captured, and an image to be displayed in which a virtual object making a banzai gesture is generated on the basis of the captured image, and is displayed on the HMD 100, a mismatch corresponding to the delay time occurs between the time at which the user made a banzai gesture and the time at which the virtual object makes a banzai gesture on the HMD 100.

Then, in order to make the virtual object make a banzai gesture on the HMD 100 exactly when the user makes a banzai gesture, the server device 12 needs to use captured images acquired in a temporal order to predict that the user is about to make a banzai gesture, and generate prediction images in which the virtual object is making a banzai gesture before the user makes a banzai gesture. That is, the server device 12 grasps in advance delay time in the information processing system 1 before generating images, and uses images captured a predetermined length of time (which is equal to the delay time) before the user makes a banzai gesture to generate prediction images in which the virtual object makes a banzai gesture. Thereby, the virtual object displayed on the HMD 100 also makes a banzai gesture exactly when the user actually makes a banzai gesture, and it becomes possible to make the real world and the virtual world synchronized with each other.

As explained above, the delay time in the information processing system 1 can be classified into delay time in the image processing system and delay time in the image transmission system. The length of time required for the processing system largely depends on device capability, and, if measured once, the measurement can be utilized almost as a fixed value. On the other hand, the length of time required for the transmission system depends the state of the network 2, and easily varies. Then, preferably the information processing device 10 periodically measures delay time, and provides the server device 12 with measured latest delay time, that is, highly reliable delay time.

The position data acquiring unit 200 acquires position data indicating a real object position. The position data about an object may be data about a three-dimensional position in a real space, but may be data about a position in a two-dimensional space. Either way, the position data needs to have a temporal order based on which the server device 12 can identify past movements of an object, and predict future movements of the object.

The position data acquiring unit 200 in the embodiment is a captured image acquiring unit that acquires image data obtained through image-capturing by the image capturing device 14, and the captured images include position data about an object in a real space. As explained above, position data about an object included in captured images may be any data as long as it is available for the server device 12 to utilize as data for performing object motion prediction. Here, an object position includes positions of parts of the object, positions of the contours, and the like. The position data acquiring unit 200 may acquire detection data of a displacement sensor that detects displacement of an object, may acquire detection data of an infrared sensor, and may acquire these types of data in a mixed form. Note that although in the embodiment, the object to be treated as the target of motion prediction is a human, and the position data acquiring unit 200 acquires user position data, the object to be treated as the target of motion prediction may be an animal such as a cat or a dog, and may be a thing such as a car or a ball. The server device 12 uses the position of a user included in captured images captured in a temporal order to identify a user movement, predict a future user movement, and generate an image including a virtual object corresponding to the position (posture) of the user at a future time.

The line-of-sight direction determining unit 220 determines the user's line-of-sight direction according to motion data about the HMD 100. Specifically, the line-of-sight direction determining unit 220 uses sensor data of the motion sensor 124 to detect changes of a movement of the HMD 100, and determine the posture of the HMD 100. Note that preferably the line-of-sight direction determining unit 220 further utilizes results of image-capturing of the tracking marker 110 to enhance movement detection accuracy. The line-of-sight direction determining unit 220 uses a detected movement to identify the current posture of the HMD 100, obtain the user's line-of-sight direction from the identified HMD 100, and provide the user's line-of-sight direction to the data supply unit 202.

Through the communication unit 210, the data supply unit 202 supplies the motion predicting unit 300 of the server device 12 with position data acquired by the position data acquiring unit 200 (captured images in the embodiment), and the user's line-of-sight direction determined by the line-of-sight direction determining unit 220. The communication unit 210 encodes the position data and the user's line-of-sight direction, and sends them to the server device 12 through the network 2. The communication unit 304 in the server device 12 receives and decodes the encoded data, supplies the position data to the motion predicting unit 300 and the image generating unit 302, and supplies the user's line-of-sight direction to the image generating unit 302. The motion predicting unit 300 predicts a future movement of an object (user) from the temporal order of the supplied position data, that is, from captured images supplied in a temporal order so far. Specifically, the motion predicting unit 300 identifies a past movement of the user from the temporal order of a plurality of pieces of captured image data supplied so far, and predicts a future movement of the user.

There are various conventional, proposed techniques for human motion prediction. In one conventional technique, various patterns of motions performed by humans are determined in advance, and characteristic motions (including preparatory motions) of each motion pattern are extracted empirically and statistically, and are classified in advance. Then, observation data that is actually obtained in a temporal order is collated with the classified motions, and a motion pattern is identified from matched motions, and is predicted as a future motion. Therefore, by preparing a plurality of state prediction models that match each motion pattern, comparing the likelihood with respect to observation data, and selecting an appropriate state prediction model, highly accurate human motion prediction can be performed. For example, as state prediction models for the motion pattern of "banzai gesture," a motion of raising both hands directly upward without spreading the arms horizontally, a motion of raising both hands while spreading the arms horizontally equally, and the like may be prepared in advance.

The motion predicting unit 300 extracts a user movement from captured image data acquired in a temporal order, identifies a motion pattern, and selects a matching state prediction model. Thereby, the motion predicting unit 300 can predict a future user movement, and can identify the position (posture) of a user at a future time which is an arbitrary length of time ahead of a current time point. Note that the motion predicting unit 300 may use, in combination, a technique of predicting a future posture through linear extrapolation of changes of the posture of the user in the past, and also may utilize another technique.

In the embodiment, the motion predicting unit 300 acquires delay time derived in the information processing device 10. Based on supplied captured image data, the motion predicting unit 300 predicts a user movement, and identifies the position (posture) of the user at a future time which is a predetermined length of time ahead, the predetermined length of time being equal to or longer than the delay time. Here, the identified user posture is a posture of the user at a future time which is a predetermined length of time ahead, the predetermined length of time being equal to or longer than the delay time, but ideally it is a posture of the user at a future time which is delay time ahead, and actually may be a posture of the user at a future time which is a predetermined length of time ahead, the predetermined length of time being a little longer than the delay time. When the motion predicting unit 300 predicts a user movement, and identifies a position of the user at a future time, the image generating unit 302 generates a prediction image in which the predicted future position of the user is reflected. Specifically, the image generating unit 302 identifies a position (posture) of a virtual object at a future time which is delay time ahead by making the virtual object move such that the movement of the virtual object in a virtual three-dimensional space matches the user movement predicted in the motion predicting unit 300. The virtual object may be formed of bone data, and a human-body model with meshes attached around bones, but this is not the sole example, and the virtual object may be any object as long as it can assume any posture as a three-dimensional human-body model. The image generating unit 302 arranges, in a virtual three-dimensional space, a virtual camera having an optical axis lying along the user's line-of-sight direction, and captures an image of the virtual object to thereby generate a prediction image in the virtual three-dimensional space to be displayed on the HMD 100.

The communication unit 304 encodes the prediction image generated by the image generating unit 302, and sends the encoded data to the information processing device 10 through the network 2. The communication unit 210 in the information processing device 10 receives and decodes the encoded data, and supplies the decoded prediction image to the display image providing unit 204. The display image providing unit 204 acquires the prediction image, and provides the prediction image to the HMD 100, and the control unit 120 displays the prediction image on the display panel 130.

Hereinafter, a technique of deriving delay time is explained. Delay time determines a future time for which the motion predicting unit 300 makes a prediction, and needs to be derived before the motion predicting unit 300 performs a motion prediction process. On the other hand, since, as explained above, delay time varies depending on the state of the network 2, preferably delay time is derived frequently, and corresponds to changes of the state of the network 2.

In an example explained below, on the assumption that the delay deriving unit 206 has derived delay time in the past, and has the derived delay time, delay time is newly derived. The delay deriving unit 206 derives delay time including a length of time that elapses from a time when the position data acquiring unit 200 acquires position data to a time when the display image providing unit 204 provides, to the HMD 100, a prediction image in which a user position at a future time predicted on the basis of the position data is reflected.

When the delay time deriving process is started, the light emission instructing unit 208 supplies the HMD 100 with an instruction to the light emitting unit 112 to emit light. At this time, the light emission instructing unit 208 provides the delay deriving unit 206 with information about a time at which the light emission instruction is supplied.

Upon acquisition of the light emission instruction by the communication control unit 128 at the HMD 100, the control unit 120 makes the light emitting unit 112 perform impulse light emission. An image of the impulse light emission performed by the light emitting unit 112 is captured by the image capturing device 14, and the position data acquiring unit 200 acquires the captured image capturing the light emission of the light emitting unit 112.

The data supply unit 202 has delay time derived in the past by the delay deriving unit 206. Along with a user's line-of-sight direction and delay time, the data supply unit 202 supplies the captured image acquired by the position data acquiring unit 200 to the server device 12 from the communication unit 210. This delay time is delay time derived by the delay deriving unit 206 before the captured image being sent this time is acquired by the position data acquiring unit 200.

The communication unit 210 encodes the captured image, line-of-sight direction, and delay time and sends them to the server device 12 through the network 2. At the server device 12, the communication unit 304 receives and decodes the captured image, line-of-sight direction, and delay time, supplies the captured image and delay time to the motion predicting unit 300, and supplies the captured image and line-of-sight direction to the image generating unit 302. The motion predicting unit 300 uses the temporal order of the captured image supplied this time, and captured images supplied in the past to predict the position (posture) of the user at a future time which is the delay time ahead (or a future time which is a predetermined length of time ahead, the predetermined length being a little longer than the delay time). On the basis of the user movement predicted by the motion predicting unit 300, the image generating unit 302 generates a prediction image in which the position of the virtual object reflects a position of the user at a future time.

The image generating unit 302 analyzes the captured image supplied from the communication unit 304, and determines whether or not light emission of the light emitting unit 112 is captured. The image generating unit 302 is notified of an emission light color of the light emitting unit 112 in advance, and determines that light emission of the light emitting unit 112 is captured if an image of the notified emission light color is included in the region of the HMD 100 included in the captured image. Upon determining that light emission of the light emitting unit 112 is captured in the captured image, the image generating unit 302 embeds, in a prediction image to be generated, information indicating that the prediction image is an image generated on the basis of an image capturing light emission of the light emitting unit 112.

Any technique may be used to embed this information, and, for example, the image generating unit 302 adds a point image having the same color as the emission light color of the light emitting unit 112 at a position of the virtual object corresponding to the light emitting unit 112 of the HMD 100 (that is, around the position of the forehead of the virtual object). Note that the image generating unit 302 may embed, in meta data, information indicating that it is an image generated on the basis of an image in which light emission of the light emitting unit 112 is captured. Either way, this information may be embedded in any manner as long as it is made possible to identify at the information processing device 10 that it is a prediction image generated on the basis of an image in which light emission of the light emitting unit 112 is captured.

Note that if the light emitting unit 112 can emit light with multiple colors, the light emission instructing unit 208 instructs which color of light should be emitted, and the light emitting unit 112 emits the instructed color of light, the image generating unit 302 may embed, in a prediction image, information indicating that the prediction image is an image generated on the basis of an image in which light emission of the light emitting unit 112 is captured and that indicates which color of light the light emitting unit 112 emitted.

The communication unit 304 encodes the prediction image generated by the image generating unit 302, and sends the encoded prediction image to the information processing device 10 through the network 2. The communication unit 210 in the information processing device 10 receives and decodes the prediction image, and supplies the prediction image to the display image providing unit 204. The display image providing unit 204 provides the prediction image to the HMD 100 and the delay deriving unit 206. The HMD 100 displays the prediction image on the display panel 130. Motions of the user and motions of a virtual object displayed on the display panel 130 are synchronized perfectly ideally.

The delay deriving unit 206 determines whether information indicating that a prediction image is an image generated on the basis of an image in which light emission of the light emitting unit 112 is captured is embedded in the prediction image. If such information is embedded, the delay deriving unit 206 derives, as delay time, the difference between a time at which the light emission instructing unit 208 supplied a light emission instruction to the HMD 100 and a time at which the display image providing unit 204 provided the prediction image to the HMD 100. The difference between these two times includes a length of time that elapse from a moment when the position data acquiring unit 200 acquires position data to a moment when the display image providing unit 204 provides a prediction image generated on the basis of the position data to the HMD 100.

Note that although in the embodiment, the delay deriving unit 206 derives delay time by using a time at which the light emission instructing unit 208 supplied a light emission instruction to the HMD 100, it may derive delay time by using a time at which the position data acquiring unit 200 acquired position data. In this case, it is only required to notify the delay deriving unit 206 of the acquisition time upon acquisition of the position data by the position data acquiring unit 200.

Upon deriving delay time, the delay deriving unit 206 replaces delay time derived in the past with the derived new delay time, and provides it to the data supply unit 202. The data supply unit 202 overwrites and updates the old delay time with the newly derived delay time. Along with the delay time that the data supply unit 202 has, the data supply unit 202 sends position data acquired by the position data acquiring unit 200 to the server device 12 from the communication unit 210. Thereby, the motion predicting unit 300 becomes able to predict a position of a user in a real space after the elapse of the delay time based on the acquired position data. Preferably, the light emission instructing unit 208 supplies light emission instructions to the HMD 100 periodically, and the delay deriving unit 206 derives delay time periodically.

Note that the delay deriving unit 206 may derive total delay time by using the technique explained above that utilizes light emission of the light emitting unit 112, but may derive delay time of the processing system and delay time of the transmission system while distinguishing between them. In the embodiment, delay time of the processing system is the sum total of time that is required for processes such as an image-capturing process performed by the image capturing device 14, a captured-image acquiring process performed by the position data acquiring unit 200, an encoding process and a decoding process performed by the communication unit 210 and the communication unit 304, a motion prediction process performed by the motion predicting unit 300, and an image generation process performed by the image generating unit 302. The time required for these processes depends on the device capabilities of the information processing device 10 and the server device 12, and barely changes in a state where an excessive load is not placed on them. Then, the delay deriving unit 206 may obtain delay time of the processing system once in advance, and thereafter utilize it as a fixed value.

On the other hand, delay time of the transmission system easily changes depending on the condition of the network 2. Then, the delay deriving unit 206 may periodically measure round trip time between the communication unit 210 and the communication unit 304, and derive delay time of the transmission system. The total delay time is obtained by adding the delay time of the processing system and delay time of the transmission system, and the delay deriving unit 206 may derive delay time of the transmission system periodically, and provide the total delay time to the data supply unit 202. Note that the delay deriving unit 206 may derive delay time by using a time stamp, and the technique of deriving delay time is not limited to any one technique. For example, the delay deriving unit 206 may derive delay time by extrapolation using a plurality of lengths of delay time measured in the past, or may estimate current delay time by guessing the traffic situation of a network through simulations.

In the example explained above, a prediction image is generated in the following manner: the motion predicting unit 300 uses captured images supplied in a temporal order to predict a position (posture) of a user at a future time which is delay time ahead, and the image generating unit 302 arranges, in a three-dimensional virtual space, a virtual camera having an optical axis lying along a user's line-of-sight direction. By the delay deriving unit 206 deriving delay time frequently, it becomes possible to make user movements and movements of a virtual object displayed on the HMD 100 synchronized with each other.

Figure 5:
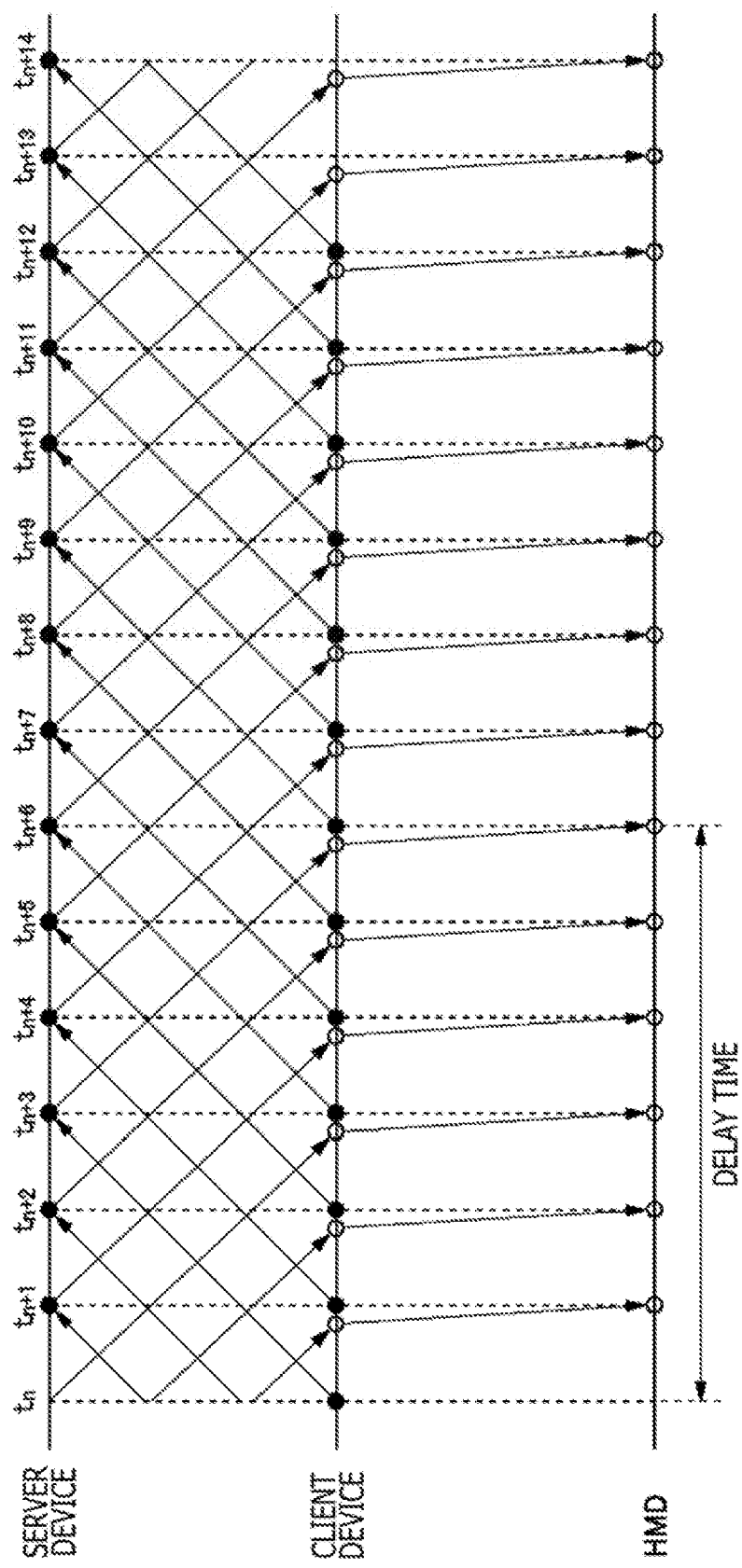
FIG. 5 is a figure for explaining delay time.

FIG. 5 is a figure for explaining delay time. Here, the time interval (tn to tn+1) illustrated in FIG. 5 is $\frac{1}{30}$ seconds. Therefore, the interval between the time tn to a time tn+6 is $\frac{6}{30}$ seconds.

In the example illustrated in FIG. 5, the image capturing device 14 captures an image of a user at the time tn, the information processing device 10 sends the captured image to the server device 12, and the server device 12 receives the captured image at a time tn+3. Thereafter, at the server device 12, a process of predicting a user motion is performed, and a prediction image in which a user movement at a future time which is delay time ahead is reflected in the posture of a virtual object is generated, and is sent to the information processing device 10. The information processing device 10 receives the prediction image, and sends the received prediction image to the HMD 100. In this example, the HMD 100 receives and displays the prediction image at the time tn+6. Note that the interval between the time tn and the time tn+6 is actual delay time, and is 0.2 seconds (=$\frac{6}{30}$ seconds) in this example.

As illustrated in FIG. 5, captured images are sent from the information processing device 10 to the server device 12 at periods of $\frac{1}{30}$ seconds also after the time tn. In this example, prediction images generated at the server device 12 are received at the information processing device 10 at periods of $\frac{1}{30}$ seconds. That is, the network 2 is stable, and delay time remains constant. In this manner, if there are no fluctuations of delay time, the motion predicting unit 300 may use acquired captured images to predict the posture of a user after 0.2 seconds, and the image generating unit 302 may generate a prediction image in which the posture of the virtual object is synchronized with the predicted posture of the user.

However, in such a situation where the network 2 experiences an instantaneous high load, a prediction image might not reach the information processing device 10 even after the elapse of the set delay time (0.2 seconds). To cope with such a situation, in addition to a prediction image of a future time which is delay time ahead (referred to as a "first prediction image"), the image generating unit 302 may generate a second prediction image of a future time further ahead of the time point of the first prediction image.

When reference is made to FIG. 5, the image generating unit 302 uses a captured image captured at the time tn to generate a first prediction image of a future time which is delay time ahead, that is, an image in which a predicted posture of the user at the time tn+6 is reflected in the posture of a virtual object, but may further generate a second prediction image of a time tn+7, and moreover may generate a third prediction image of a time tn+8.

In this manner, in addition to a first prediction image of a future time which is delay time ahead, the image generating unit 302 may generate a second prediction image and a third prediction image of future times which are predetermined time ahead, the predetermined time being the delay time plus integer multiples of the display period at the HMD 100. In this example, the image generating unit 302 uses a captured image captured at the time tn to generate a first prediction image of the time tn+6, a second prediction image of the time tn+7, and a third prediction image of the time tn+8. Thereby, if the prediction image of the time tn+7 generated by the image generating unit 302 by using the captured image captured at the time tn+1 does not reach the display image providing unit 204 by the time tn+7, the display image providing unit 204 provides the HMD 100 with the second prediction image of the time tn+7 that has been acquired before the time tn+7. Thereby, control can be performed so as to avoid disruption of images displayed on the HMD 100.

Note that the display image providing unit 204 may be able to perform a certain degree of image processing (image deformation) based on prediction images. If the display image providing unit 204 has an image processing function, the image generating unit 302 may generate a prediction image of a time between the time tn+6 and the time tn+7 and may generate a prediction image of a time before the time tn+6. If a prediction image of the time tn+7 does not arrive, the display image providing unit 204 may use the prediction image of the time between the time tn+6 and the time tn+7 to generate an image of the time tn+7, and provide the generated image to the HMD 100.

The present invention has so far been explained on the basis of the embodiment. The embodiment illustrates examples, and those skilled in the art should understand that various variants are possible about combinations of individual constituent elements or individual processes of those examples, and such variants fall within the scope of the present invention. Although in the embodiment, the motion predicting unit 300 uses past movements of a user to predict a future movement of the user, the motion predicting unit 300 may further predict a movement of an object in a virtual space. In this case, the motion predicting unit 300 has a physical engine computing function, and may perform a process to determine a collision with a virtual object such as a ball about a movement of a virtual object corresponding to a user in a virtual space, for example. Upon determining that both the virtual objects will collide, the motion predicting unit 300 may send collision data from the communication unit 304 to the information processing device 10. The collision data may be communicated to a haptics device worn by a user, and the haptics device may provide a tactile feedback based on the collision data to the user.

Although in the embodiment, one information processing device 10 is present as a client device in the information processing system 1, there may be a plurality of information processing devices 10 as client devices in a variant.

FIG. 6 is a figure illustrating an example in which there are a client devices A and a client device B. Similar to FIG. 5, the time interval is 1/30 seconds. The client devices A and B may be information processing devices 10 of a different user A and user B. This is equivalent to the state where two information processing devices 10 are connected to the network 2, when reference is made to FIG. 1. Here, it is supposed that there is such a situation that the user A and the user B are playing a tennis game in the same virtual space. The server device 12 preferably generates prediction images such that, in the prediction images, a movement of the user A and a movement of the user B are synchronized to movements of their corresponding player characters in the game space.

In the client device A, along with first delay time derived by the delay deriving unit 206, the data supply unit 202 supplies position data about the user A to the motion predicting unit 300 of the server device 12. The first delay time is 0.2 seconds.

In the client device B, along with second delay time derived by the delay deriving unit 206, the data supply unit 202 supplies position data about the user B to the motion predicting unit 300 of the server device 12. The second delay time is 0.4 seconds.

At the moment of a time tn+6, the server device 12 acquires, from the client device A, a captured image of the user A captured at a time tn+3, and acquires, from the client device B, a captured image of the user B captured at a time tn. The server device 12 takes delay time of each of the client devices A and B into consideration, and generates a prediction image for the client device A and a prediction image for the client device B. Note that in this example, it is supposed that time stamps indicating image-capturing times are included in captured images sent from the client devices.

For the client device A, the motion predicting unit 300 predicts positions (postures) of the user A and user B at a future time tn+9 which is first delay time ahead from the acquisition time (time tn+3) of the captured image of the user A on the basis of the captured image of the user A and the captured image of the user B. In the example illustrated in FIG. 6, the motion predicting unit 300 predicts, about the user A, a posture after 0.2 seconds (=(time tn+9)−(time tn+3)), and predicts, about the user B, a posture after 0.3 seconds (=(time tn+9)−(time tn)). The image generating unit 302 generates a prediction image in which the future positions of the user A and the user B predicted by the motion predicting unit 300 are reflected. This prediction image is sent to the client device A.

In addition, for the client device B, the motion predicting unit 300 predicts positions (postures) of the user A and user B at a future time tn+12 which is second delay time ahead from the acquisition time (time tn) of the captured image of the user B on the basis of the captured image of the user A and the captured image of the user B. In the example illustrated in FIG. 6, the motion predicting unit 300 predicts, about the user A, a posture after 0.3 seconds (=(time tn+12)−(time tn+3)), and predicts, about the user B, a posture after 0.4 seconds (=(time tn+12)−(time tn)). The image generating unit 302 generates a prediction image in which the future positions of the user A and the user B predicted by the motion predicting unit 300 are reflected. This prediction image is sent to the client device B.

In the manner as explained above, the server device 12 may perform a user motion prediction process so as to prevent appearance of apparent delays on a plurality of client devices.

Note that it is supposed that the user A and the user B are playing a match in a tennis game. If delay time of either of them is long or the difference between lengths of delay time of both of them is large, it is anticipated that it becomes very hard for the motion predicting unit 300 to perform a motion prediction process. Therefore, at the server device 12, the image generating unit 302 may perform image generation processes like the ones explained below.

In one technique, while the motion predicting unit 300 performs motion prediction of the users A and B, the image generating unit 302 makes a player character of each of the users A and B make a motion independently of a motion prediction result basically. Specifically, the image generating unit 302 generates such simulation images in which player characters continue a rally, and provides the simulation images to each of the client devices A and B. The users A and B play tennis watching those game images, and here if a missed shot by the user B is detected at the server device 12, the image generating unit 302 generates a game image in which the character of the user B missed the shot, and provides the game image to the client devices A and B.

In another technique, the game-like quality is maintained when delay time is long, by controlling the speed of an object (here, a tennis ball) that directly affects a win and a loss of the match play. If delay time is long, moving the tennis ball fast makes it difficult to communicate the same game situation to the users A and B. Therefore, the game is controlled to ensure that there is a sufficient length of time to communicate the same game situation to the users A and B by moving the tennis ball at a very slow speed. In this case, although the image generating unit 302 may perform control to move each player character according to a result predicted by the motion predicting unit 300, the ball, which influences the game-like quality, is controlled to move slowly in order to enable communication of the same game situation to the users A and B.

REFERENCE SIGNS LIST

1 . . . Information processing system, 10 . . . Information processing device, 12 . . . Server device, 14 . . . Image capturing device, 16 . . . Output device, 100 . . . HMD; 200 . . . Position data acquiring unit, 202 . . . Data supply unit, 204 . . . Display image providing unit, 206 . . . Delay deriving unit, 208 . . . Light emission instructing unit, 210 . . . Communication unit, 220 . . . Line-of-sight direction determining unit, 300 . . . Motion predicting unit, 302 . . . Image generating unit, 304 . . . Communication unit

INDUSTRIAL APPLICABILITY

The present invention can be utilized for technical fields of generating and displaying images in which movements of real objects are reflected.

The invention claimed is:

1. An information processing system that generates an image to be wireless transmitted to a display device, the information processing system comprising:
a position data acquiring unit that acquires position data indicating a position of a real object;
a delay deriving unit that derives delay time in the information processing system;
a motion predicting unit that predicts a movement of the object, and identifies an object position at a future time which is a predetermined length of time ahead, on a basis of the position data acquired by the position data acquiring unit, the predetermined length of time being equal to or longer than the delay time;
an image generating unit that generates a prediction image in which the object position at the future time is reflected; and
a display image providing unit that acquires the generated prediction image, and wireless transmits the prediction image to the display device, wherein
the delay deriving unit derives delay time including a length of time that elapses from a time when the position data acquiring unit acquires position data to a time when the display image providing unit provides, to the display device, a prediction image in which an object position at a future time predicted on a basis of the position data is reflected,
wherein the delay time is a combination of a first delay time required for generating the prediction image and a second delay time required for wirelessly transmitting the prediction image to the display device, and
wherein the second delay time is periodically updated to match a current wireless latency.

2. The information processing system according to claim 1, further comprising:
a data supply unit that supplies the motion predicting unit with position data acquired by the position data acquiring unit, wherein
the data supply unit supplies the motion predicting unit with position data along with delay time derived by the delay deriving unit before the position data is acquired.

3. The information processing system according to claim 2, comprising:
a client device and a server device that are connected through a network, wherein
the position data acquiring unit, the data supply unit, and the display image providing unit are provided in the client device, and
the motion predicting unit and the image generating unit are provided in the server device.

4. The information processing system according to claim 3, wherein the motion predicting unit performs a process to judge a collision between a virtual object and the object in a virtual space, and, upon judging that the virtual object and the object collide, sends collision data to the client device.

5. The information processing system according to claim 3, comprising:
a first client device and a second client device, wherein
in the first client device, the data supply unit supplies the motion predicting unit of the server device with first-object position data along with first delay time derived by the delay deriving unit, and
in the second client device, the data supply unit supplies the motion predicting unit of the server device with second-object position data along with second delay time derived by the delay deriving unit,
in the server device,
for the first client device, the motion predicting unit uses the first-object position data and the second-object position data to predict a first object position and a second object position at a future time which is the first delay time ahead from an acquisition time of the first-object position data at the first client device, and the image generating unit generates a prediction image in which the first object position at the future time and the second object position at the future time that are predicted by the motion predicting unit are reflected, and
for the second client device, the motion predicting unit uses the first-object position data and the second-object position data to predict a first object position and a second object position at a future time which is the second delay time ahead from an acquisition time of the second-object position data at the second client device, and the image generating unit generates a prediction image in which the first object position at the future time and the second object position at the future time that are predicted by the motion predicting unit are reflected.

6. An information processing device comprising:
a position data acquiring unit that acquires position data indicating a position of a real object;
a delay deriving unit that derives a delay time; and a display image providing unit that acquires a prediction image, and wirelessly transmitting the prediction image to a display, the prediction image being generated by a server device predicting a movement of the object on a basis of position data such that an object position at a future time which is a predetermined length of time ahead is reflected to the prediction image, the predetermined length of time being equal to or longer than the delay time, wherein the delay time is a combination of a first delay time for generating the prediction image by the server device and a second delay time for wirelessly transmitting the prediction image to the display device, wherein the second delay time is periodically updated to match a current wireless latency.

7. An image providing method comprising:

acquiring position data indicating a position of a real object by an information processing system;

deriving a delay time; and acquiring a prediction image, and wirelessly transmitting the prediction image to a display device, the prediction image being generated by a server device predicting a movement of the object on a basis of position data such that an object position at a future time which is a predetermined length of time ahead is reflected to the prediction image, the predetermined length of time being equal to or longer than the delay time, wherein the delay time is a combination of a first delay time for generating the prediction image by the server device and a second delay time for wirelessly transmitting the prediction image to the display device, wherein the second delay time is periodically updated to match a current wireless latency.

8. A server device comprising:

a motion predicting unit that acquires, from an information processing device, delay time and position data indicating a position of a real object, predicts a movement of the object, and identifies an object position at a future time which is a predetermined length of time ahead, the predetermined length of time being equal to or longer than the delay time; and an image generating unit that generates a prediction image in which the position of the object at the future time is reflected, wherein the delay time comprises a delay for wirelessly transmitting the prediction image, wherein the second delay time is periodically updated to match a current wireless latency.

* * * * *